United States Patent
Vaaland et al.

(10) Patent No.: US 10,681,253 B1
(45) Date of Patent: Jun. 9, 2020

(54) MODULAR CAMERA APPARATUS

(71) Applicant: HUDDLY AS, Oslo (NO)

(72) Inventors: Kjartan Vaaland, Oslo (NO); Niklas Schmidt, Oslo (NO); Sofie Karoline Trovik, Oslo (NO)

(73) Assignee: HUDDLY AS, Oslo (NO)

( * ) Notice: Subject to any disclaimer, the term of this patent is extended or adjusted under 35 U.S.C. 154(b) by 0 days.

(21) Appl. No.: 16/241,130

(22) Filed: Jan. 7, 2019

(51) Int. Cl.
*H04N 5/225* (2006.01)
*G02B 7/02* (2006.01)

(52) U.S. Cl.
CPC ........... *H04N 5/2254* (2013.01); *G02B 7/026* (2013.01)

(58) Field of Classification Search
CPC .................. H04N 5/2254; G02B 7/026
See application file for complete search history.

(56) References Cited

U.S. PATENT DOCUMENTS

| | | | | |
|---|---|---|---|---|
| 2006/0203627 A1* | 9/2006 | Osaka | ...................... | G02B 7/08 369/44.16 |
| 2008/0316623 A1* | 12/2008 | Aoki | ...................... | G02B 7/04 359/823 |
| 2012/0013741 A1* | 1/2012 | Blake, III | ............. | B60S 1/0881 348/148 |
| 2012/0039593 A1* | 2/2012 | Yang | ...................... | G03B 15/05 396/175 |
| 2016/0011394 A1* | 1/2016 | Cho | ........................ | G02B 7/09 359/822 |
| 2016/0041453 A1* | 2/2016 | Pizzo | ..................... | G02B 7/026 396/530 |
| 2016/0299349 A1* | 10/2016 | Cho | ........................ | G02B 27/646 |
| 2016/0313628 A1* | 10/2016 | Brodie | ............... | H02K 41/0356 |
| 2017/0244885 A1* | 8/2017 | Lin | ..................... | H04N 5/23206 |
| 2018/0007244 A1* | 1/2018 | Wang | ................... | H04N 5/2252 |
| 2018/0024307 A1* | 1/2018 | Lo | ............................. | G02B 7/02 348/335 |
| 2019/0174032 A1* | 6/2019 | Yang | .................... | H04N 5/2254 |

* cited by examiner

*Primary Examiner* — Lin Ye
*Assistant Examiner* — John H Morehead, III
(74) *Attorney, Agent, or Firm* — Edgetech Law LLP

(57) ABSTRACT

A modular camera apparatus with a discontinuous snap joint is provided for snap-fitting a lens ring to a camera module enclosed in a main case of the camera apparatus, thereby improving the manufacture and assembly efficiency.

7 Claims, 9 Drawing Sheets

MODULAR CAMERA APPARATUS

BACKGROUND OF THE DISCLOSURE

The present disclosure relates in general to the manufacture and assembly of optic devices and cameras. Specifically, the present disclosure relates to the assembly of camera devices and components. More specifically, a modular assembly apparatus is provided for snap-fitting a lens ring to a camera module enclosed in a main case of the camera apparatus, thereby improving manufacture efficiency and cost.

Like many precision electronics and optics devices, modern cameras including smart cameras tend to be increasingly compact and yet costly to manufacture. This is the case particularly because the assembly of various optic and camera components often requires specialized equipment, highly-skilled technicians, and multi-step processes. There is therefore a need for improved apparatuses to increase the ease, speed, and reduce the cost, of making and assembling camera components and devices.

SUMMARY OF THE VARIOUS EMBODIMENTS

It is therefore an object of this disclosure to provide apparatuses for improved efficiency in manufacturing and assembling precision optic devices and cameras.

Particularly, in accordance with this disclosure, there is provided, in one embodiment, a modular camera apparatus that comprises a lens ring, a camera module, a main camera case enclosing the camera module and abutting the lens ring, and a discontinuous annular snap joint adapted to affix the lens ring to the camera module. The discontinuous annular snap joint comprises a plurality of cantilever hooks located along the perimeter of the lens ring, and a corresponding annular anchor located on the camera module. The plurality of cantilever hooks is adapted to affix onto the annular anchor thereby assembling the lens ring with the camera module.

In another embodiment, the plurality of cantilever hooks is made from thermoplastics. In yet another embodiment, the plurality of cantilever hooks is made from the group consisting of acrylonitrile butadiene styrene (ABS), nylon, and polyoxymethylene (POM). In a further embodiment at least one contact point of each cantilever hook in the plurality is made of silicone.

According to another embodiment, the annular anchor is made from one of metal and stiff plastics. In yet another embodiment, the annular anchor is made from one of liquid crystal polymer (LCP) and aluminum.

According to a further embodiment, the plurality of cantilever hooks comprises three cantilever hooks located along the perimeter of the lens ring.

DETAILED DESCRIPTION OF THE VARIOUS EMBODIMENTS

The modular camera apparatus of this disclosure includes three modules according to one embodiment: a lens ring, a camera module, and a main camera case. The lens ring and the camera module together provide a discontinues snap joint with a plurality of cantilever hooks and an annular anchor adapted to affix the lens ring to the camera module.

Figure 1:
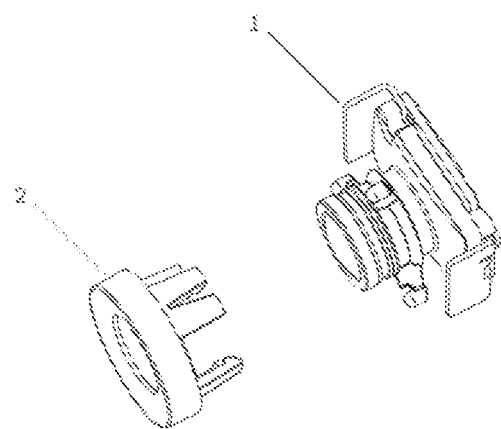
FIG. 1 depicts a lens ring and a camera module according to one embodiment of this disclosure.
Figure 2:
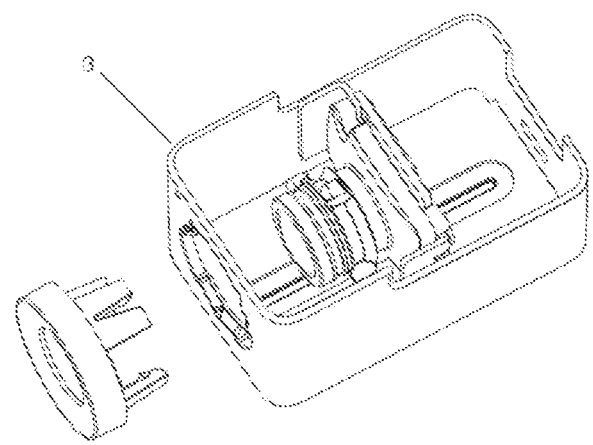
FIG. 2 depicts the lens ring and a main camera case enclosing a camera module according to one embodiment.
Figure 3:
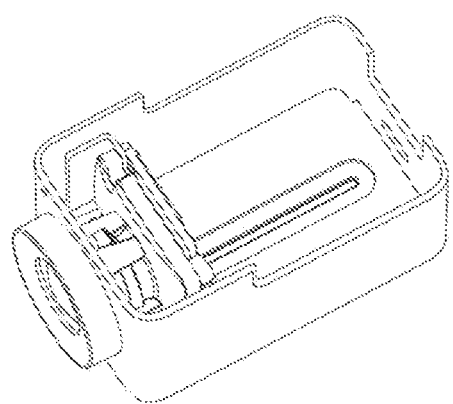
FIG. 3 depicts the lens ring affixed to the camera module, the camera module being enclosed in the main camera case according to one embodiment.
Figure 4:
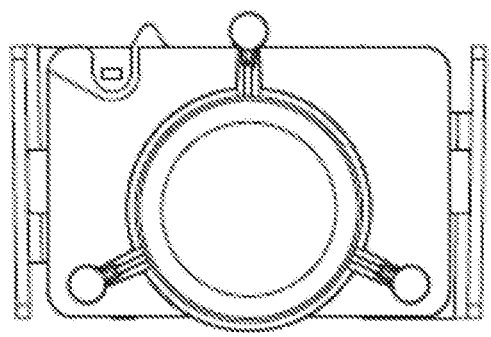
FIG. 4 depicts a front view of the camera module, showing an annular anchor according to one embodiment.

Referring to FIG. 1, the lens ring module (1) has a plurality of cantilever hooks along its perimeter, and the camera module (2) has a corresponding annular anchor. Referring to FIG. 2, the camera module is enclosed in a main camera case (3). Referring to FIG. 3, the lens ring and the camera module enclosed in the main camera case are mounted together via the discontinuous snap joint. This shows the assembled apparatus of this disclosure, including the lens ring, the camera module and the main camera case. Referring to FIG. 4, in one embodiment, the plurality of cantilever hooks in the discontinuous snap joint comprises three cantilever hooks. This detailed front view of the discontinuous snap joint shows three contact points of the cantilever hooks and the annular anchor.

Figure 5:
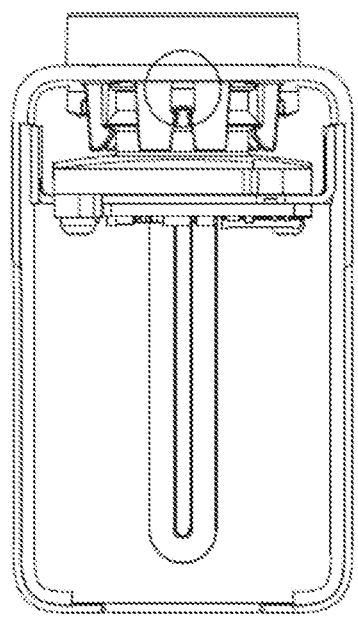
FIG. 5 depicts a top view of the modular camera apparatus, showing the lens ring affixed to the camera module enclosed in the main camera case via the discontinuous snap joint with three cantilever hooks and the corresponding annular anchor according to one embodiment.
Figure 6:
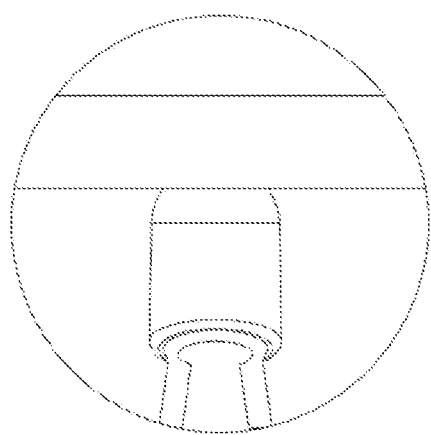
FIG. 6 is an enlarged view of a part of FIG. 5, showing a contact point at one cantilever hook against the main camera case in one embodiment.

FIG. 5 shows how the lens ring is affixed to the camera module via the discontinuous snap joint with three cantilever hooks and the corresponding annular anchor. FIG. 6 is an enlarged view of a part of FIG. 5, showing the detail of a contact point at one cantilever hook against the main camera case.

Figure 7:
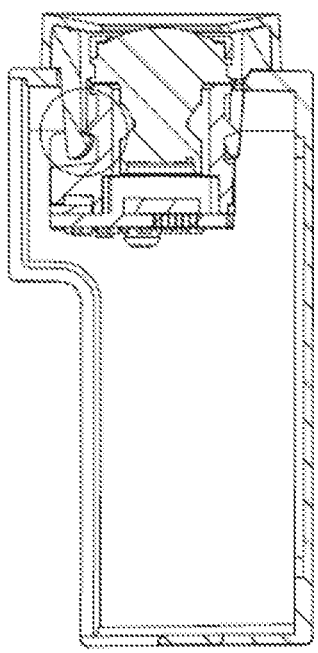
FIG. 7 depicts a left-right side transverse sectional view of the modular camera apparatus, showing the lens ring affixed to the camera module enclosed in the main camera case via the discontinuous snap joint according to one embodiment.
Figure 8:
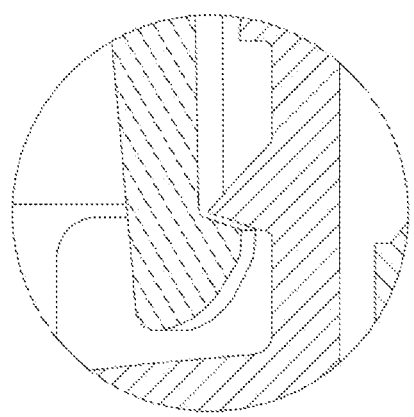
FIG. 8 is an enlarged view of a part of FIG. 7, showing the snap joint at one cantilever hook affixed to the corresponding annular anchor in one embodiment.
Figure 9:
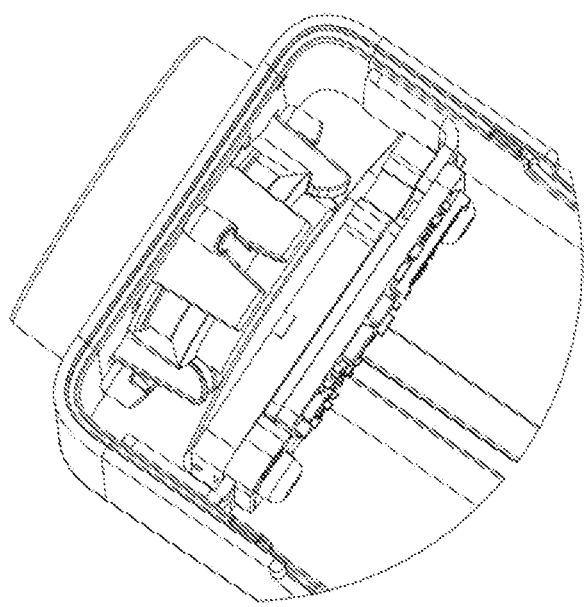
FIG. 9 is an enlarged top view of the discontinuous snap joint, showing three cantilever hooks on the lens ring affixed to the annular anchor on the camera module according to one embodiment.

FIG. 7 is an additional side sectional view of the modular camera apparatus, showing the lens ring affixed to the camera module enclosed in the main camera case via the discontinuous snap joint. FIG. 8 is an enlarged view of a part of FIG. 7, showing in detail the snap joint at one cantilever hook affixed to the corresponding annular anchor. FIG. 9 is an enlarged top view of the discontinuous snap joint, showing three cantilever hooks on the lens ring affixed to the annular anchor on the camera module.

The plurality of cantilever hooks on the lens ring is made from thermoplastics according to one embodiment. Various materials are suitable including acrylonitrile butadiene styrene (ABS), nylon, and polyoxymethylene (POM). In a further embodiment, at least one contact point of each cantilever hook in the plurality is made of silicone. This provides certain flexibility for fitting into individual main camera cases in mass production, thereby ensuring tight mechanical fitting of the modules.

The camera module and its annular anchor is made from one of metal and stiff plastics according to this disclosure. Glass-reinforced liquid crystal polymer (LCP) is suitable in one embodiment, and aluminum is in another embodiment.

The modular camera apparatus of this disclosure with a discontinuous snap joint is advantageous in the manufacturing and assembling of camera devices. The snap joint of various embodiments requires no glue, screws, or other affixing mechanisms, and thus improves the speed and reduces the cost of assembly.

The descriptions of the various embodiments, including the drawings and examples, are to exemplify and not limit the invention and the various embodiments thereof.

We claim:

1. A modular camera apparatus comprising a lens ring, a camera module, a main camera case enclosing the camera module and abutting the lens ring, and a discontinuous annular snap joint adapted to affix the lens ring to the camera module, wherein the discontinuous annular snap joint comprises a plurality of cantilever hooks located along the perimeter of the lens ring, and a corresponding annular anchor located on the camera module, and wherein the plurality of cantilever hooks is adapted to affix vertically onto the annular anchor thereby assembling the lens ring with the camera module.

2. The apparatus of claim 1, wherein the plurality of cantilever hooks is made from thermoplastics.

3. The apparatus of claim 2, wherein the plurality of cantilever hooks is made from the group consisting of acrylonitrile butadiene styrene (ABS), nylon, and polyoxymethylene (POM).

4. The apparatus of claim 2, wherein at least one contact point of each cantilever hook in the plurality is made of silicone.

5. The apparatus of claim 1, wherein the annular anchor is made from one of metal and stiff plastics.

6. The apparatus of claim 5, wherein the annular anchor is made from one of liquid crystal polymer (LCP) and aluminum.

7. The apparatus of claim 1, wherein the plurality of cantilever hooks comprises three cantilever hooks located along the perimeter of the lens ring.

* * * * *